United States Patent
She

(10) Patent No.: US 7,292,435 B2
(45) Date of Patent: Nov. 6, 2007

(54) PROTECTIVE DEVICE FOR A LIQUID CRYSTAL DISPLAY

(76) Inventor: Wang-Lung She, No. 724, Wu Chia 1st Rd., Kaohsiung Hsien, Fengshan City 830 (TW)

( * ) Notice: Subject to any disclaimer, the term of this patent is extended or adjusted under 35 U.S.C. 154(b) by 37 days.

(21) Appl. No.: 11/164,786

(22) Filed: Dec. 6, 2005

(65) Prior Publication Data

US 2007/0127194 A1    Jun. 7, 2007

(51) Int. Cl.
*H05K 5/00*    (2006.01)
(52) U.S. Cl. .................. 361/681; 345/32; 248/371; 359/609
(58) Field of Classification Search ............... 361/681, 361/682; 359/609, 608; 248/391, 371, 971; 345/32
See application file for complete search history.

(56) References Cited

U.S. PATENT DOCUMENTS

| | | | | |
|---|---|---|---|---|
| 5,209,448 A | * | 5/1993 | Hatanaka et al. ........... 248/455 |
| 5,797,570 A | * | 8/1998 | Dolan et al. ............. 248/205.3 |
| 5,971,548 A | * | 10/1999 | Hung .......................... 359/609 |
| 6,050,833 A | * | 4/2000 | Danzyger et al. ............. 439/92 |
| 6,967,635 B2 | * | 11/2005 | Hung .......................... 345/32 |
| 2006/0061945 A1 | * | 3/2006 | Kim ........................... 361/681 |

* cited by examiner

*Primary Examiner*—Lisa Lea-Edmonds
*Assistant Examiner*—Ingrid Wright
(74) *Attorney, Agent, or Firm*—Alan Kamrath; Kamrath & Associates P.A.

(57) ABSTRACT

A protective device for a liquid crystal display has a protective plate, a plate holder, a holding block, a strip and a clamping device. The plate holder has a groove on a top, a flange extending backward and an abutting recess defined under the flange. The holding block combines with the plate holder and has a channel for receiving the strip. When the protective device mounts on a monitor of the liquid crystal display, the flange rests on a flat top of an outer frame of the monitor to make the abutting recess snugly combine with the outer frame. When the protective plate engages the groove and erects in front of a screen panel of the monitor, the strip ties the protective plate and the monitor together and the clamping device holds the plate and the outer frame of the monitor to keep the protective plate steady.

10 Claims, 9 Drawing Sheets

PROTECTIVE DEVICE FOR A LIQUID CRYSTAL DISPLAY

BACKGROUND OF THE INVENTION

1. Field of the Invention

The present invention relates to a protective device for a liquid crystal display and, more particularly, to a protective device that can be conveniently attached to a liquid crystal display, has a simple structure and keeps the appearance of the liquid crystal display neat to view the full screen on the liquid crystal display without obstruction.

2. Description of Related Art

A liquid crystal display is a planar and thin monitor and has various types such as twisted nematic (TN), super twisted nematic (STN), thin film transistor (TFT) and metal/insulator/metal (MIM). Taking TFT as an example, a TFT liquid crystal display. has basic elements including a glass substrate, color filters, polarizers, driving integrated circuits, a liquid crystal layer, isotropic membranes, backlighting modules, ITO conductive membranes and a frame enclosing other elements inside. The TFT liquid crystal display has now been widely substituted for the conventional cathode ray tube (CRT). Because each unit on a panel of the liquid crystal display has even distances to other adjacent and surrounding units, pixels in line do not have differences or deformation. Moreover, the liquid crystal display has diminished size, high mobility, zero radiation, no pollution problem, and excellent energy-saving capability and then gradually substitutes the conventional CRT display to become the main current of display products. However, the panel of the liquid crystal display is soft and easily penetrated by sharp objects so that the panel needs a protective device.

A conventional protective device on the market is a hanging-type protective glass that covers adjusting buttons on the liquid crystal display and has an outer frame combined with glass and multiple securing devices. When the protective glass mounts on the liquid crystal display, the multiple securing devices attach to a top of the frame of the liquid crystal display and the outer frame produces an inharmonious appearance to the liquid crystal display, especially when the liquid crystal display has a special design. When the hanging-type protective glass does not have securing devices attached below, the glass will swing easily, bump the panel and cause noise. Moreover, the hanging-type protective glass has a high manufacturing cost and can not be modified easily because its structure is complex.

Another protective device is a protective membrane made of acryl that directly attaches to the panel of the liquid crystal display with adhesive or a double-sided tape at corners. However, the adhesive or the double-sided tape easily deteriorates and then loses its adhesive capability so that the protective membrane can easily fall from the panel suddenly. Therefore, the protective membrane is not durable. Additionally, when the size of the protective membrane does not correspond to the screen of the panel, the protective membrane must attach to the screen directly and the adhesive will consequently stain the screen.

SUMMARY OF THE INVENTION

To overcome drawbacks of the conventional protective devices for the liquid crystal display, a novel protective device is provided to eliminate the drawbacks.

A main objective of the present invention is to provide a protective device for the liquid crystal display, wherein the protective device is conveniently attached to the liquid crystal display, completely protects the liquid crystal display and keeps the liquid crystal display neat in appearance.

Another main objective of the present invention is to provide a protective device for the liquid crystal display, wherein the protective device has a simple structure in a small size and does not cover adjusting buttons on the liquid crystal display.

To achieve the foregoing objective, the protective device in the present invention comprises:

a plate holder adapted to attach to a right-angle portion between a screen panel and a frame on a monitor of the liquid crystal display, the plate holder having a top and a flat side adjacent the monitor and comprising:

a groove defined on the top of the plate holder;

a flange extending from the flat side near the top of the plate holder; and an abutting recess defined between the flange and the flat side and being substantially rectangular to adapt to snugly and stably engage the right-angle portion on the monitor;

a holding block optionally combined to the plate holder and having a bottom and an channel defined on the bottom of the holding block, a strip optionally and partially received inside the channel of the holding block and having two engaging elements respectively attached at two ends of the strip and correspondingly combined with each other; and a protective plate being transparent and detachably engaged the groove on the plate holder.

Further benefits and advantages of the present invention will become apparent after a careful reading of the detailed description with appropriate reference to the accompanying drawings.

DETAILED DESCRIPTION OF THE PREFERRED EMBODIMENT

A protective device for a liquid crystal display in accordance with the present invention comprises a protective plate, a plate holder, a holding block, a strip and an optional clamping device. The plate holder has a U-shaped body with a groove on top, a flange extending toward the liquid crystal display, and an abutting recess defined under the flange. The holding block is attached to the plate holder and has a channel for receiving the strip. When the protective device mounts on a monitor of the liquid crystal display, the plate holder attaches to a joint of a screen panel and an outer frame of the monitor by resting the flange on a flat top of the outer frame to make the abutting recess snugly combine with the outer frame. The protective plate engages the groove and erects in front of the screen panel of the monitor. Moreover, the strip further ties the protective plate on the monitor and the clamping device holds the protective plate and the outer frame of the monitor together to keep the protective plate steady. By simply locating the plate holder on the outer frame of the monitor, engaging the protective plate with the groove and tying the monitor and the protective plate with the strip, the protective device is constructed conveniently and securely.

Figure 1:
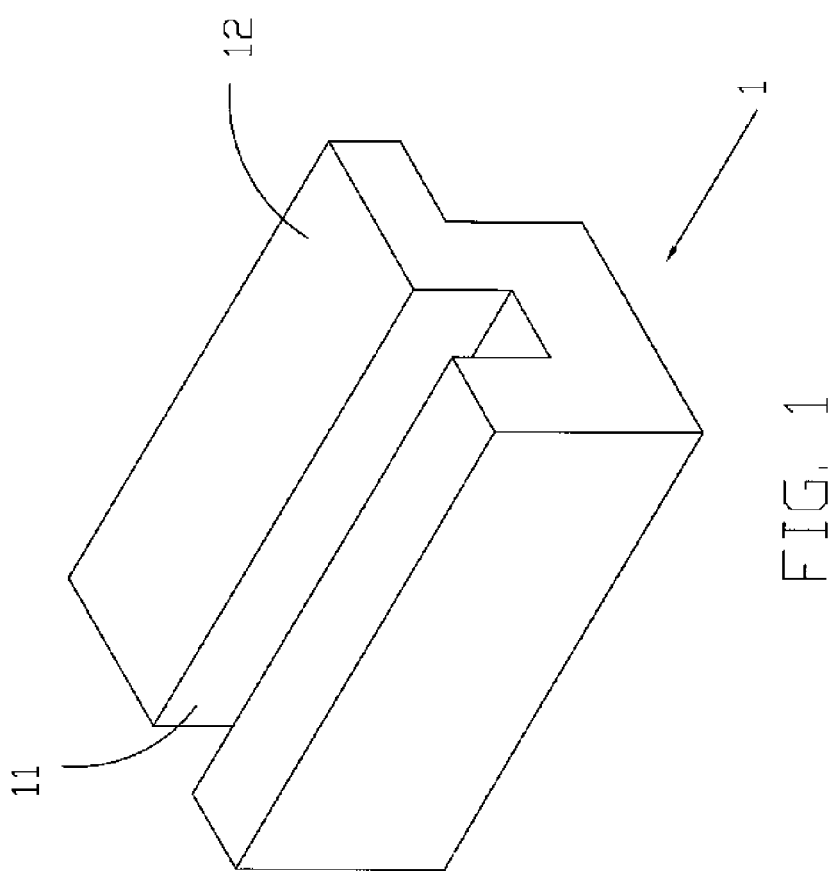
FIG. 1 is a perspective view of a plate holder of a protective device in accordance with the present invention.
Figure 2:
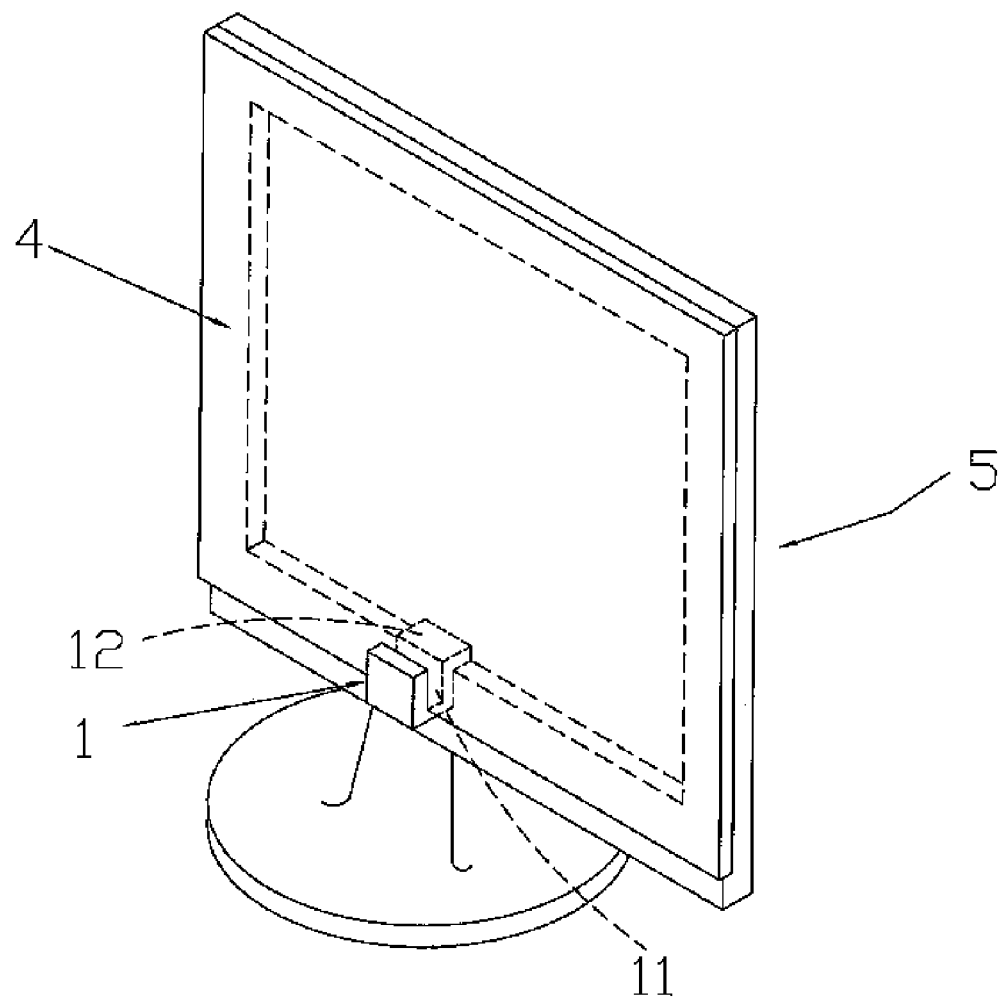
FIG. 2 is an operational perspective view of the protective device in accordance with the present invention.
Figure 3:
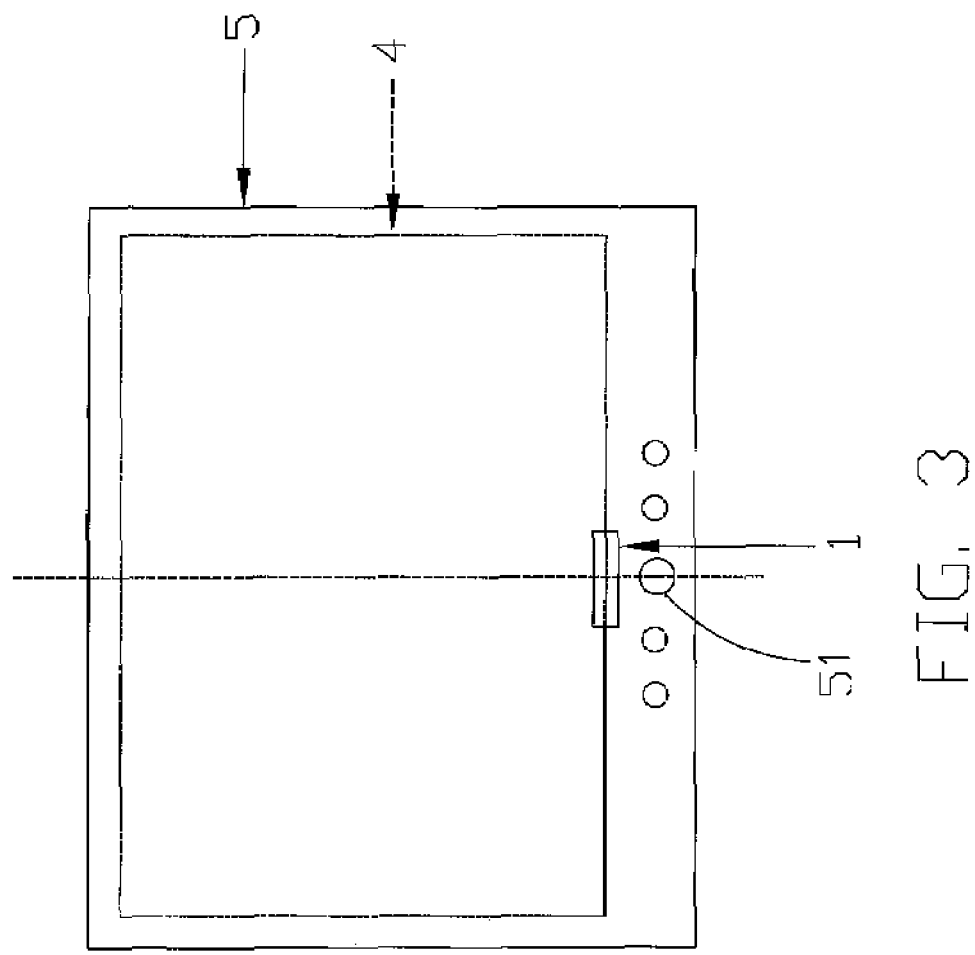
FIG. 3 is a front view of the protective device in FIG. 2.
Figure 4:
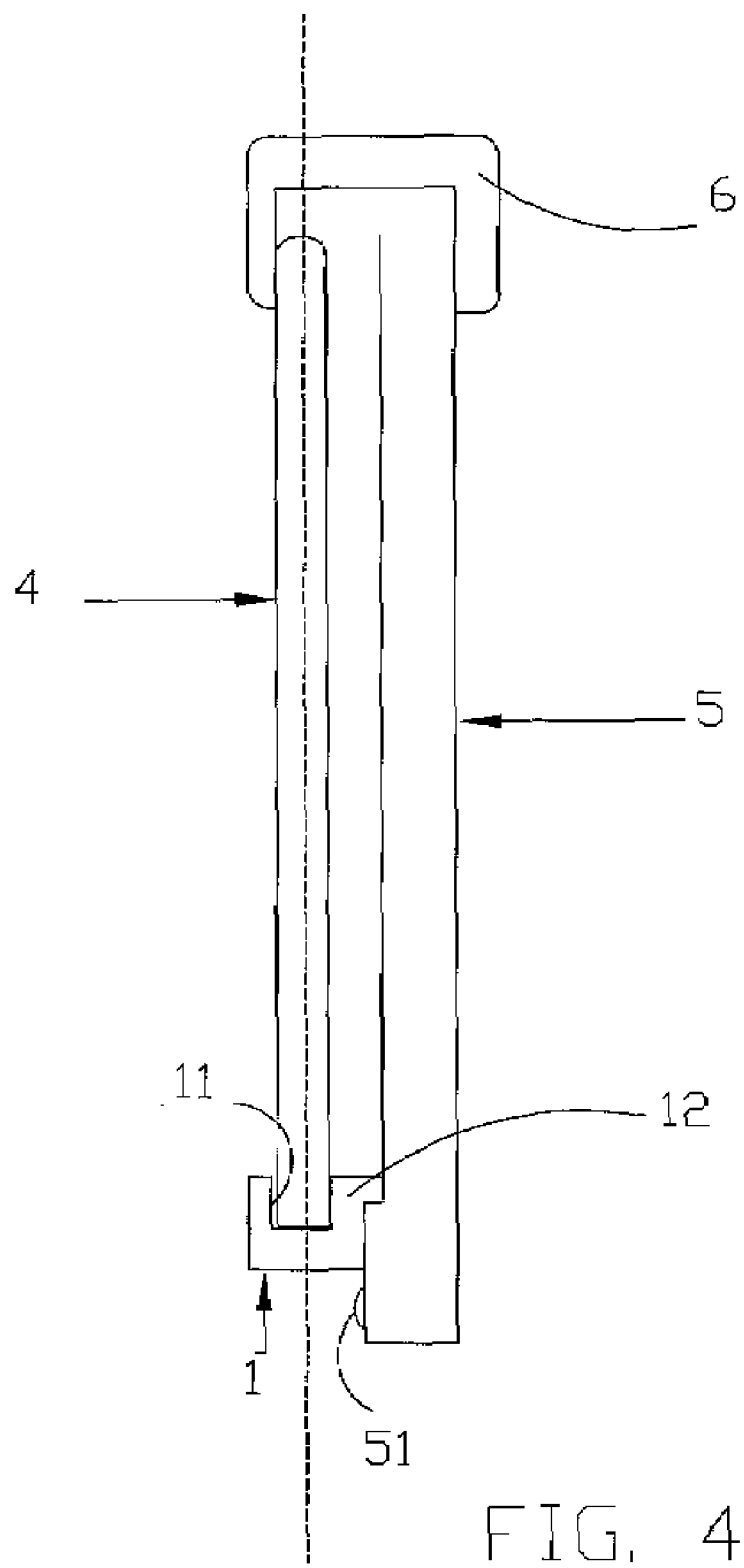
FIG. 4 is a cross-sectional side view of the protective device in FIG. 2.
Figure 5:
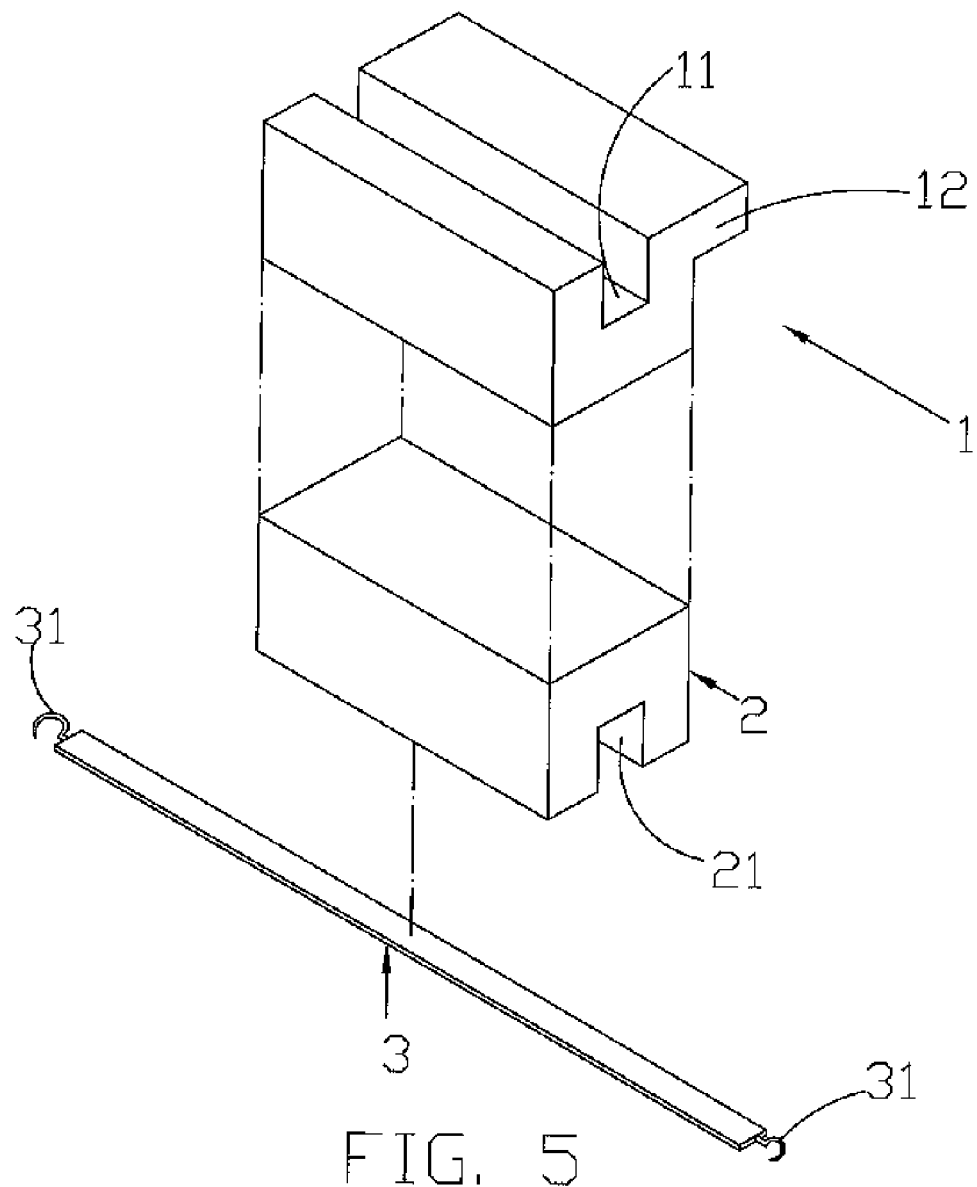
FIG. 5 is a perspective view of another embodiment of the protective device in accordance with the present invention.
Figure 6:
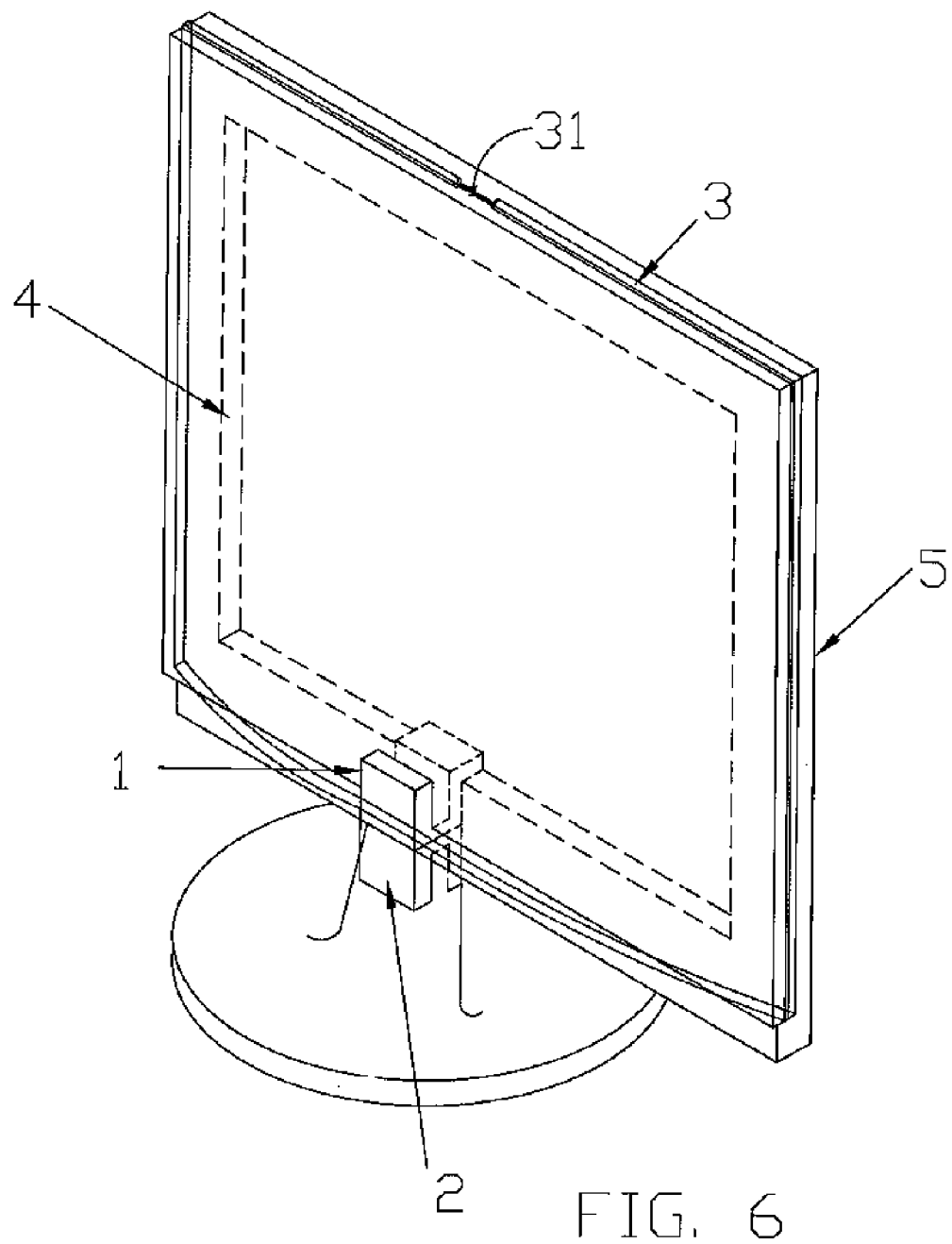
FIG. 6 is an operational perspective view of the protective device in FIG. 5.
Figure 7:
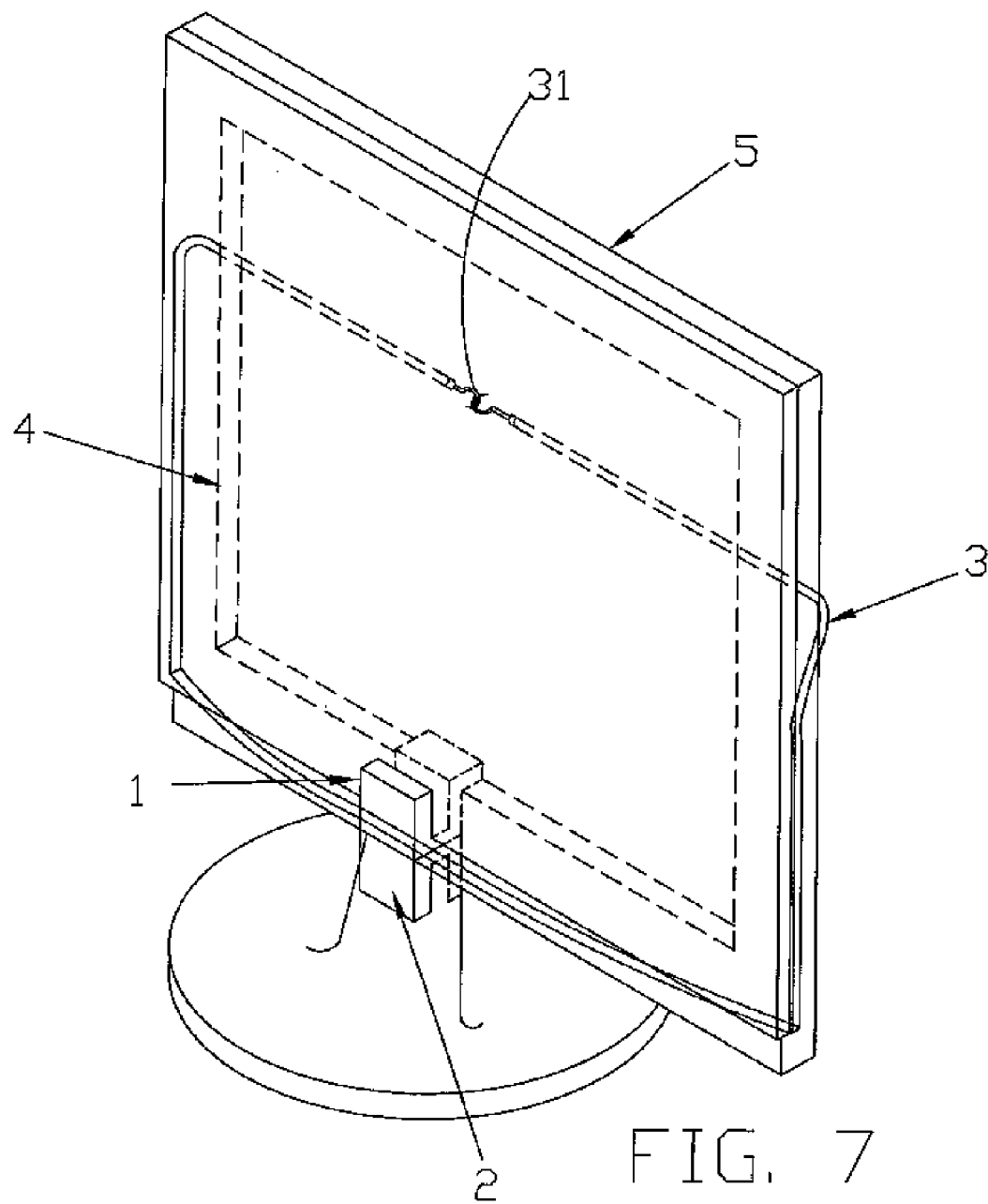
FIG. 7 is another operational perspective view of the protective device in FIG. 5.
Figure 8:
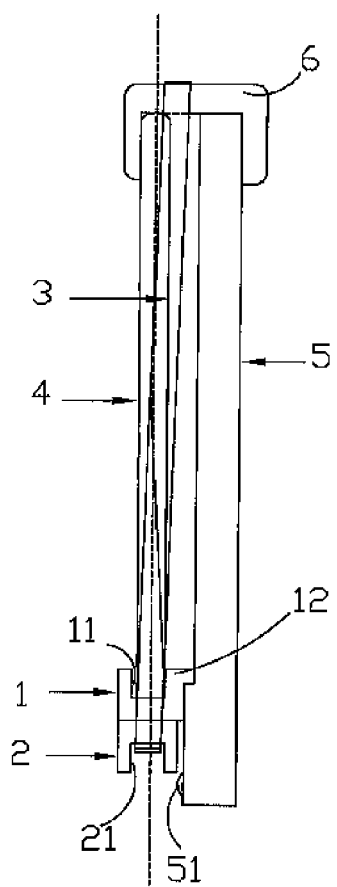
FIG. 8 is still another operational cross-sectional side view of the protective device.
Figure 9:
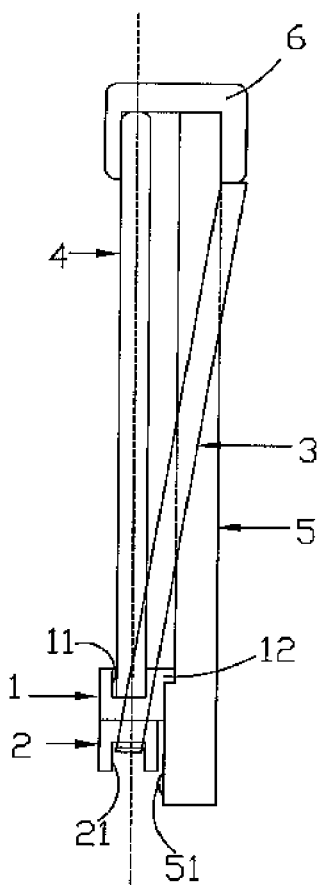
FIG. 9 is yet another operational cross-sectional side view of the protective device.

With reference to FIGS. 1, 2 and 5, a preferred embodiment of the protective device in accordance with the present invention comprises a plate holder 1, a holding block 2, a strip 3, a protective plate 4 and an optional clamping device 6 (shown in FIG. 4) and adapts to attach to a monitor 5 of liquid crystal display.

With particular reference to FIGS. 1 to 4, the plate holder 1 is a U-shaped body with a top, a bottom and a flat side adjacent to the monitor. The plate holder 1 has a groove 11 defined on the top to engage with the protective plate 4 and a flange 12 extending from the flat side near the top of the plate holder 1. Therefore, an abutting recess (not numbered) is defined between the flat side and the flange 12 and substantially rectangular to snugly engage a right-angle portion on an outer frame adjacent to a screen panel on the monitor 5. When the plate holder 1 mounts on the monitor 5, the flange 12 rests on a flat top of the right-angle portion (as shown in FIG. 4). Because the plate holder 1 has a small size and directly engages the protective plate 4 that is transparent, the appearance of the monitor 5 is kept original without an inharmonious feeling and the adjusting buttons 51 are not covered by the plate holder 1 to keep the adjusting buttons 51 touchable normally. Therefore, the plate holder 1 can be used to combine with the protective plate 4. Moreover, the protective device may selectively contain multiple plate holders 1 to keep the protective plate 4 stable on the monitor 5.

With reference to FIG. 5, the holding block 2 is attached to the bottom of the plate holder 1 and has a bottom face and a channel 21 with a longitudinal opening defined on the bottom face. Preferably, the holding block 2 is molded with the plate holder 1 in one piece.

The strip 3 is partially received inside the channel 21 and has two ends and two engaging elements 31 respectively attached to the two ends and combining with each other. Preferably, the strip 3 is made of resilient material to provide a flexible efficiency to make its length correspond with edges of various monitors in different sizes. The two engaging elements 31 are in a pair and preferred to be a hook assembly, a Velcro® fastener, or a buckle assembly.

The protective plate is frameless and transparent and made of glass, acryl or plastic having excellent transparency. Moreover, the protective device in the present invention preferably comprises at least one clamping device 6 that is a U-shaped clasp made of resilient material. As shown in FIG. 4, one clamping device 6 clamps the protective plate 4 and the monitor 5 together at the top to prevent the protective plate 4 from failing when the monitor 5 is inadvertently bumped and vibrated. Preferably, the clamping device 6 is also transparent and selectively attaches to different positions on the sides of the monitor 5.

In operation, the plate holder 1 is preferably engaged with the holding block 2 and the strip 3 to keep the protective plate 4 in front of the screen panel of the monitor 5. As shown in FIGS. 6 to 9, the plate holder 1 with the holding block 2 is attached to the monitor 5 in the same manner as described above because the holding block 2 does not obstruct the abutting recess on the plate holder 1. The strip 3 is partially received inside the channel 21 on the holding block 2 and drawn upward or even backward to tie at the clamping device 6 on the top of the monitor 5 or at the back of the monitor 5 by the two engaging elements 31. Thereby, the protective plate 4 is clamped and constrained by the holding block 2 and the clamping device 6 with the strip 3 to make the protective plate 4 stably locate on the monitor 5.

Figure 10:
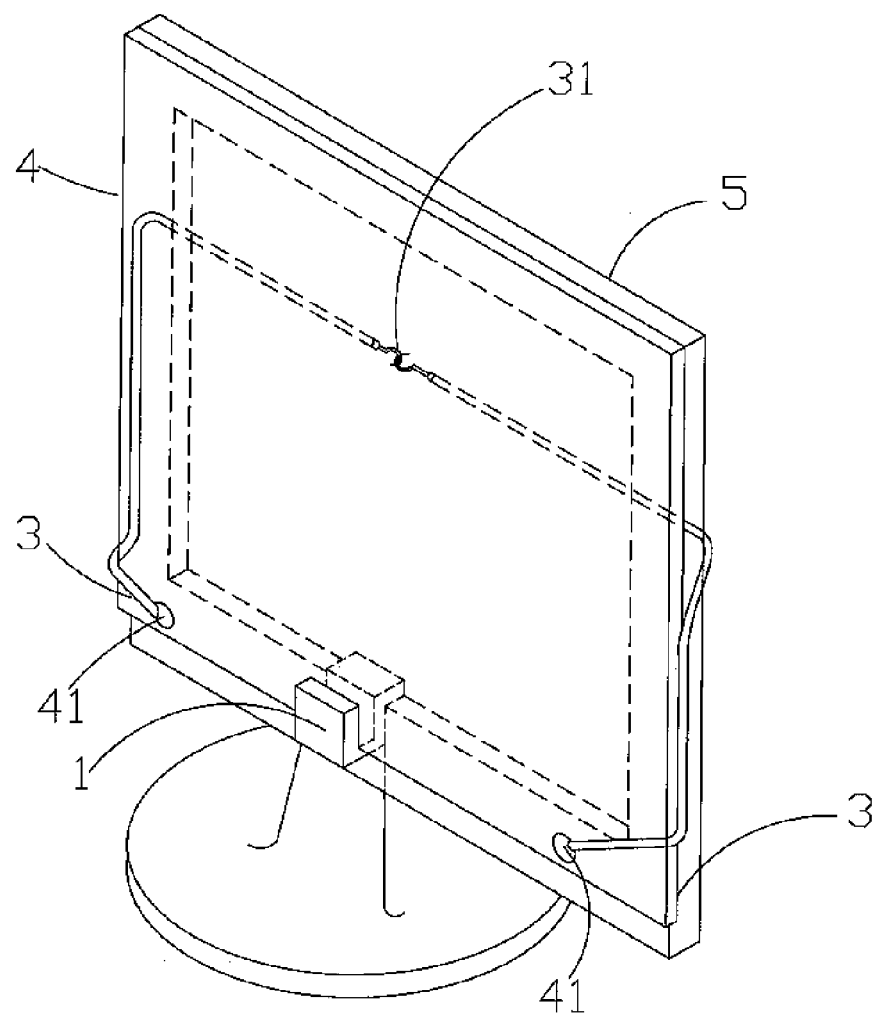
FIG. 10 is an operational perspective view of the protective device.

Moreover, the protective device without the holding block 2 can be attached to the monitor 5 in different maimers as shown in FIG. 10. The protective plate 4 has two through holes 41 respectively defined at two opposite lower corners. The strip 3 is divided into two sections, each section has a securing end attaching to the corresponding lower corner via the through hole 41 and a free end with an engaging element 31. The sections of the strip 3 are drawn upward and backward to connect the engaging elements 31 together. Then, the protective plate 4 is stably located on the monitor 5.

When the protective plate 4 is entirely transparent, the monitor 5 would not be covered behind the protective plate 4 so as to keep the monitor 5 with its original appearance, even when the protective plate 4 is not perfectly matched with screen panel in size. Moreover, the protective device can be attached to the monitor 5 of a desktop computer with a base as shown in FIG. 2 or other monitors 5 on laptops. Preferably, the protective plate 1 further has anti-glare efficiency to make users feel comfortable when they use the monitor 5 of the liquid crystal display.

When the plate bolder 1 attaches to the monitor 5 by resting the flange 12 on the flat top of the right-angle portion, the flat side of the plate holder 1 abuts the outer frame at the same time to provide a side countervailing force to keep the plate holder 1 steady. Therefore, when the protective plate 4 is placed on the plate holder 1, the weight of the protective plate 4 is compensated by a normal countervailing force from the flat top on the right angle portion and by the side countervailing force from the outer frame to keep the protective device in balance without using attaching accessories.

Additionally, because the plate holder 1 only engages and supports the protective plate 4, the size of the plate holder 1 is ideally diminished to not cover parts of the monitor 5 and the controlling buttons 51 even if the plate holder 1 is with the holding block 2. Therefore, appearance of the monitor 5 is kept original and the controlling buttons 51 are operated as usual without obstruction. Moreover, the plate holder 1 with the holding block 2 has a simple structure so that the manufacturing cost of the protective device is decreased.

According to the above description, the protective device for a liquid crystal display in the present invention comprises the following advantages:

1. The plate holder 1 directly and conveniently attaches to the monitor 5 without using any securing device or adhesives as mentioned in the conventional protective device. Therefore, the protective device of this invention can be applied to various liquid crystal displays.

2. The plate holder 1 with the holding block 2 has an ideally small size to keep the usual appearance of the monitor 5 and usual operation of the adjusting buttons 51 as because the plate holder 1 does not cover the entire portion of the monitor 5.

3. By having the strip 3 to combine the protective plate 4 and the monitor 5 or the clamping device 6, the protective plate 4 is kept stable on the plate holder 1 in front of the screen of the monitor 5.

Although this invention has been described in its preferred form with a certain degree of particularity, it is understood that the present invention of the preferred form has been made only by way of example and that numerous changes in the details of construction and the combination and arrangement of parts any be resorted to without departing from the spirit and scope of the invention.

What is claimed is:

1. A protective device for a liquid crystal display, the protective device comprising:
    a plate holder adapted to attach to a right-angle portion between a screen panel and an outer frame on a monitor of the liquid crystal display, the plate holder having a top and a flat side adjacent the monitor and comprising:
        a groove defined on the top of the plate holder;
        a flange extending from the flat side near the top of the plate holder; and
        an abutting recess defined between the flange and the flat side and being substantially rectangular to adapt to snugly and stably engage the right-angle portion on the monitor;
    a holding block combined to the plate holder and having a bottom and a channel with a longitudinal opening defined on the bottom of the holding block;
    a strip partially received inside the channel of the holding block and having two engaging elements respectively attached at two ends of the strip and correspondingly combined with each other; and
    a protective plate detachably engaged to the groove on the plate holder.

2. The protective device as claimed in claim 1, wherein the protective device further comprises at least one clamping device; each clamping device is a U-shaped clasp made of resilient material and adapts to clamp the monitor with the protective plate.

3. The protective device as claimed in claim 1, wherein the protective plate is entirely transparent and made of material selected from the group comprising: glass, acryl and plastic having excellent transparency.

4. The protective device as claimed in claim 3, wherein the protective plate has anti-glare efficiency.

5. The protective device as claimed in claim 2, wherein the at least one clamping device is entirely transparent.

6. The protective device as claimed in claim 1, wherein the two engaging elements are a pair of a hook assembly.

7. The protective device as claimed in claim 1, wherein the two engaging elements are a pair of hook and loop fasteners.

8. The protective device as claimed in claim 1, wherein the two engaging elements are a pair of a buckle assembly.

9. The protective device as claimed in claim 1, wherein the plate holder and the holding block are formed in one piece.

10. The protective device as claimed in claim 1, wherein the protective plate further has two through holes respectively defined at two opposite lower corners on the protective plate;
    the strip is divided to two sections each having a securing end attaching a corresponding one of the two opposite lower corners on the protective plate and a free end with one of the two engaging elements.

* * * * *